Feb. 6, 1934.  J. A. BROOKS ET AL  1,945,590
ELECTRICAL DISTRIBUTION SYSTEM
Filed June 19, 1931   3 Sheets-Sheet 1
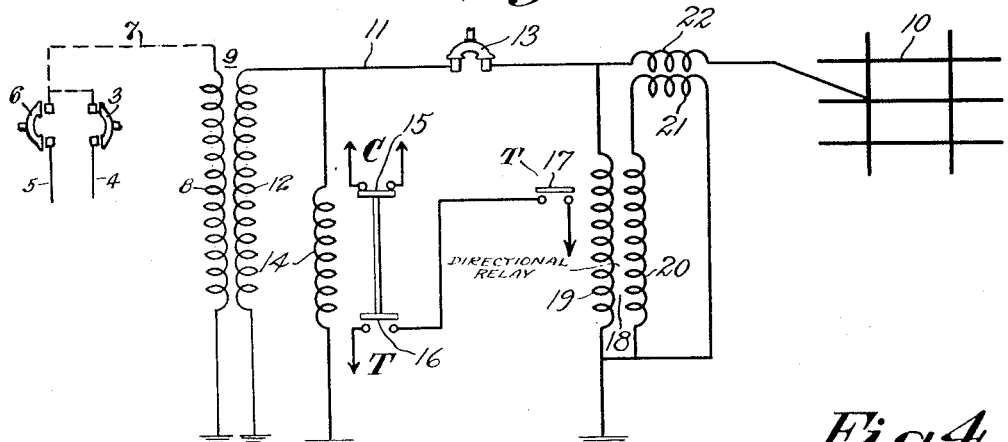
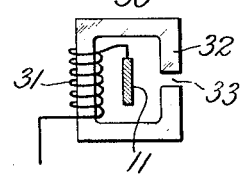
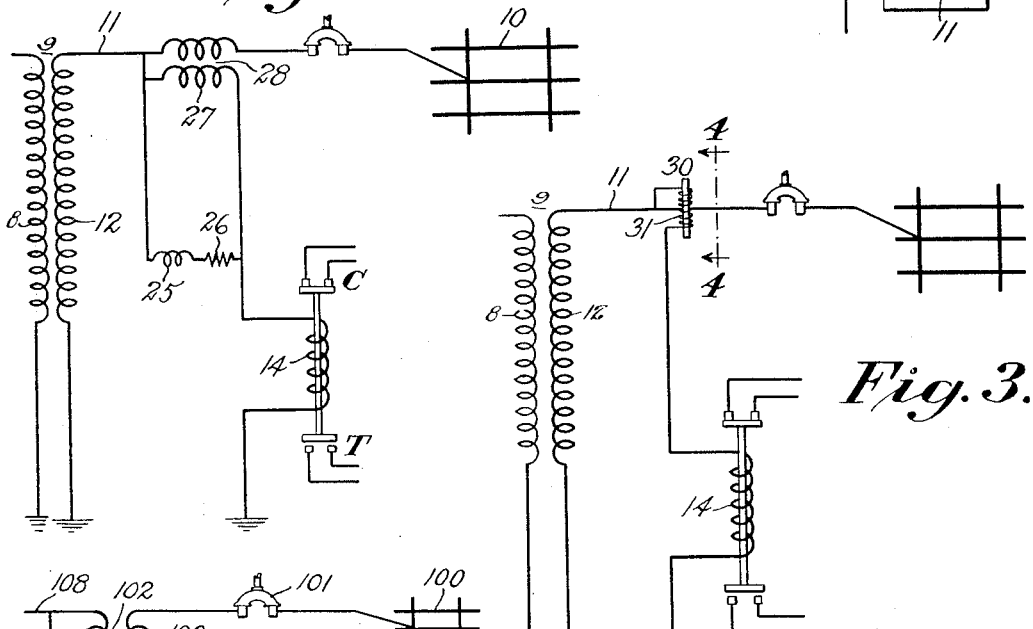
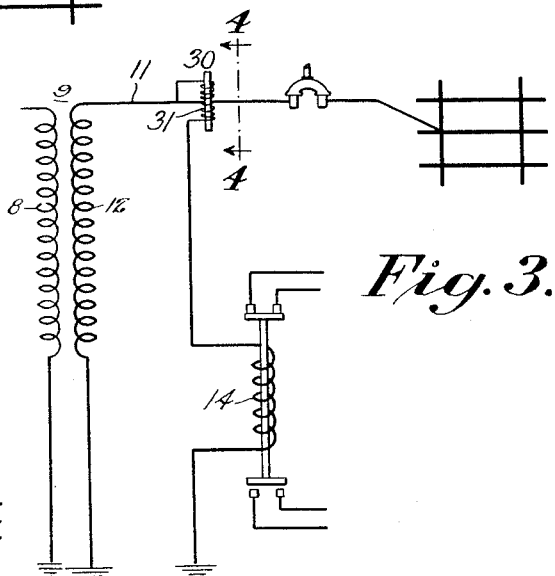
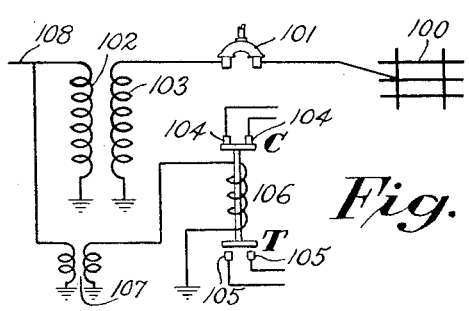

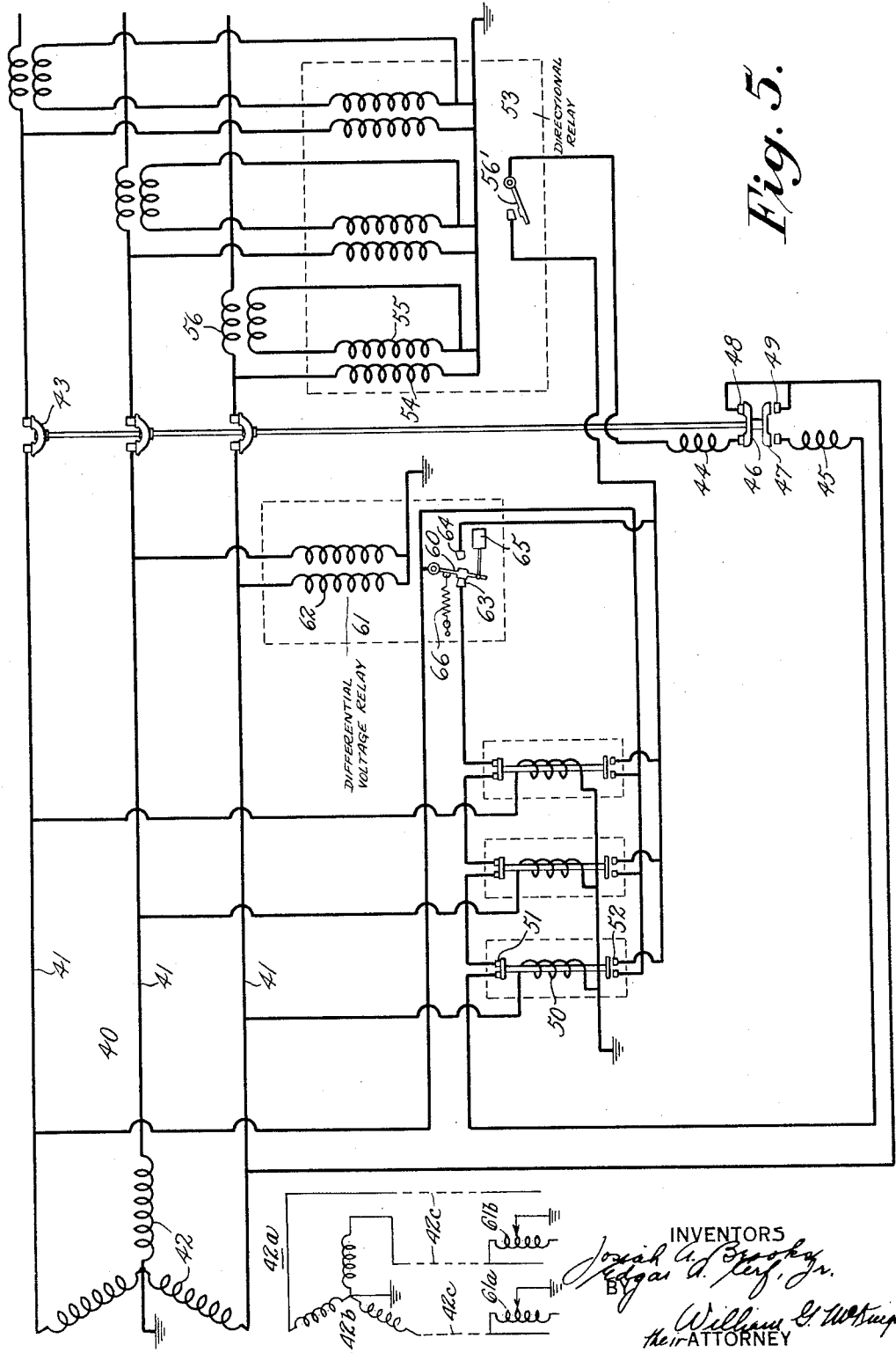

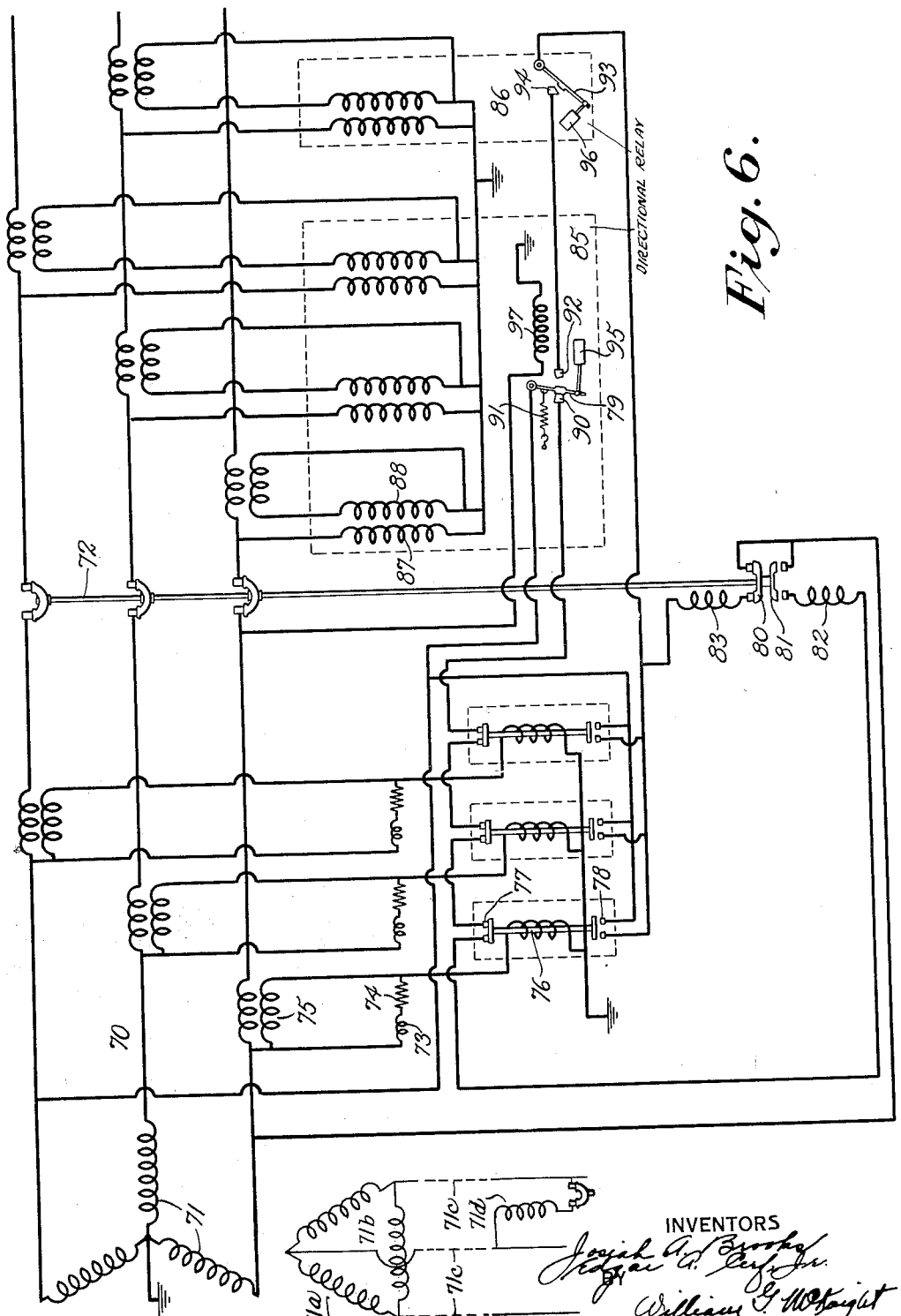

Patented Feb. 6, 1934

1,945,590

UNITED STATES PATENT OFFICE 1,945,590

ELECTRICAL DISTRIBUTION SYSTEM

Josiah A. Brooks, Bay Side, and Edgar A. Cerf, Jr., Brooklyn, N. Y., assignors to Brooklyn Edison Company, Inc., Brooklyn, N. Y., a corporation of New York Application June 19, 1931. Serial No. 545,414

16 Claims. (Cl. 171—97)

This invention relates to alternating current distribution systems in which a distribution network is supplied from one or more feeders, and provides a protective device for automatically disconnecting a feeder from the network when a predetermined condition, such as a short circuit arises on the the feeder. The invention also provides for intentionally operating the protective device from the station without seriously interfering with the conditions on the network whenever it is desired to disconnect a certain feeder from the network.

A fundamental requirement of a network protector is that it shall remain closed at all times except when there is a short circuit on the primary feeder with which it is associated, or when it is desired to open the network protector from the station supplying the network. A device controlled by reverse power flow is capable of detecting the presence of short circuit conditions by a flow of energy in the reverse direction through the network switch. However, a high energy back feed is not always a criterion of short circuits. For example, where generators are synchronized through the low voltage alternating current grid, a large amount of energy may back feed through the network with no fault on the system. On the other hand, energy backfeeding into a fault may be comparatively small due to the low power factor under short circuit conditions. It is accordingly necessary to utilize a protective device which distinguishes between reverse power flow caused by a short circuit on the feeder, and reverse power flow which may be due to normal operating conditions.

In addition to the automatic operation in response to short circuit conditions on the feeder, it is at times desirable to trip the protective device from the power station in order to disconnect the feeder from the network. This should preferably be accomplished without unnecessarily disturbing the conditions on the network or on the feeder itself.

It is an object of the present invention to provide a protective device which can be used as the connection between a feeder and a distribution network and which when so used will serve automatically to disconnect the feeder from the distribution network when, and only when, short circuit conditions occur on the feeder.

A further object of the invention is to provide a protective device of the above character, which automatically closes on the network when feeder voltage conditions are normal.

A still further object is to provide, in conjunction with the above, means for intentionally tripping the protective device from the power station without short circuiting the feeder, or otherwise seriously disturbing the conditions therein.

Another object is to provide a device for the purpose specified, which is simple, dependable and efficient.

The above objects and others which will be apparent as the nature of the invention is disclosed, are accomplished according to the present invention by utilizing the protective device which is adapted to trip the circuit breaker when the voltage on the feeder drops to an abnormally low value, as due to a short circuit condition, and to re-close when the feeder voltage is restored to normal. In a system which does not employ a power transformer between the feeder and the distribution network, it is necessary to utilize a directional relay in addition to the loss of voltage relay in order to distinguish between voltage drop on the feeder caused by a short circuit on the distribution network and a voltage drop caused by short circuit on the feeder itself. If a power transformer is employed, however, the device may be caused to operate on loss of primary voltage which may be taken directly from the primary or may be taken from the secondary side of the transformer and compensated for the transformer regulation so as to simulate primary voltage.

In order to intentionally disconnect the feeders from the power house, an additional control device is employed which operates in response to predetermined line conditions, which can be artificially imposed thereon, but which are not likely to occur during normal operation of the system. Such line conditions may consist of reversal of power caused by current of low power factor which may be made to flow through the protector at a reduced voltage, or may consist of a voltage unbalance between two phases of a polyphase system, or a flow of power in one direction in one or more phases of a polyphase system and an accompanying flow of power in the opposite direction in the remaining phases, as will be more fully described hereinafter.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which, Fig. 1 is a diagrammatic representation of a network protector operating on the principle of loss of voltage at switch 13 and reversal of power flow;

Fig. 2 illustrates diagrammatically a modified form of protector in which the operating voltage is taken from the secondary of the power transformer;

Fig. 3 illustrates a modification of the system of Fig. 2;

Fig. 4 is a detail of part of the apparatus shown in Fig. 3;

Fig. 5 is a schematic diagram of an adaptation of the network protector illustrated in Fig. 1 as applied to a three phase distribution system;

Fig. 6 is a schematic diagram of the system illustrated in Fig. 2 applied to a three phase distribution system; and Fig. 7 is a schematic diagram of a network protector in which the control is obtained by the primary voltage on the feeder.

Like reference characters denote like parts in the several figures of the drawings.

In the following description and in the claims parts will be identified by specific names for convenience, but they are intended to be as generic in their application to similar parts as the art will permit.

Referring more particularly to Fig. 1, a distribution network 10 is shown as supplied through a line 11 from the secondary 12 of a transformer 9 having a primary 8, which represents the usual step down transformer for reducing the feeder voltage to a voltage suitable for application to the distribution network. Obviously the transformer may be omitted in certain systems in which case secondary 12 may represent any source of power. The power flow through line 11 is controlled by an alternating current circuit breaker 13, which may be operated by the usual trip and closing circuits not shown. The primary 8 is supplied from a feeder 7 which is connected through switch 6 to a bus 5 at a power house or other remote source of current. An auxiliary bus 4 carrying, for example, a voltage lower than and lagging the feeder voltage may be connected to feeder 7 through switch 3.

The circuit breaker 13 is controlled by a loss of voltage relay represented at 14, which is connected across the secondary 12 of the transformer, and is provided with closing contacts 15 which are connected in circuit with the closing coil of the circuit breaker and with tripping contacts 16, which are connected in series with tripping contacts 17, to be described, and the tripping coil of the circuit breaker. The loss of voltage relay 14 is so adjusted that closing contacts 15 will be closed whenever a normal voltage appears on line 11, and that tripping contacts 16 will be closed whenever the line voltage drops below a predetermined value.

In addition to the loss of voltage relay, above described, a directional relay 18 is employed which is adapted to operate tripping contacts 17. Said directional relay comprises a potential coil 19 which is connected across the line on the network side of circuit breaker 13, and a current coil 20 which is connected across the secondary 21 of a current transformer, the primary 22 of which is connected in series with line 11. This directional relay operates on the principle of a watt hour meter, that is, the potential coil and the current coil are so arranged that the fluxes set up by the currents therein pass through a metal disk. The flux due to the power component of current passing through the current coil 20 is 90° out of phase with that due to the current in the potential coil 19, and the combined effect of the two fluxes sets up a rotary magnetic field which induces eddy currents in the disk, thereby producing a torque which tends to rotate the disk with the magnetic field. The above construction of watt hour meter, is well-known and has accordingly not been illustrated in detail.

The two coils are so connected that the disk is caused to rotate in the direction to close the relay contacts 17 when power flows through the circuit breaker towards the transformer and is caused to rotate in the direction to open the relay contacts 17 when the power flow is towards the net work.

In the above described system a short circuit on the feeder reduces the voltage on line 11 sufficiently to operate loss of voltage relay 14, closing tripping contacts 16. At the same time a reversal of power flow through the directional relay causes tripping contacts 17 to close thereby completing a circuit to the tripping coil of the circuit breaker, and causing the circuit breaker to open. The circuit breaker will remain open until the fault on the feeder has been cleared and voltage on the feeder again rises to the normal value thereby operating the loss of voltage relay to close contacts 15 which energize the closing coil of the circuit breaker. Immediate reclosure is prevented by so designing the loss of voltage relay that a substantial difference in potential is required between the operation of the tripping contacts and of the closing contacts.

It will be noted in the above system that when a short circuit occurs on the network, the drop in voltage might be sufficient to operate the loss of voltage relay, and close tripping contacts 16. However, under these conditions, the direction of power flow would be such that the directional relay would not operate and the contacts 17 would not close. This prevents the circuit breaker from tripping open in response to short circuit conditions on the network.

It may be further noted with a reversal of power by itself, i. e., unaccompanied by a voltage drop, would not operate the circuit breaker inasmuch as tripping contacts 16 of the loss of voltage relay would remain open and the closing of contacts 17 only would not energize the tripping coil.

It will be further noted that after the voltage conditions on the network feeder are restored to normal, or near normal, the loss of voltage relay moves to the closing position, thereby energizing the closing coil of the circuit breaker and again connecting the feeder to the network.

With this protective scheme it is not necessary to set the trip out voltage of the loss of voltage relay appreciably below the lowest voltage that will obtain on the system under normal conditions because the directional relay will always prevent the network switch from tripping open unless the direction of power flow is reversed. If the direction of power flow is reversed there is no harm in the network switch opening momentarily provided the generators supplying the system are synchronized through other circuits.

In cases where generators are synchronized through the low voltage A C network and a short circuit occurs on the network feeder associated with one generator, there will be a power flow from the network into the faulty feeder, and there may also be a reversal power flow in other network feeders supplied by the same generator. However, there is an inherent time delay under these conditions before the reversal takes place in the other feeders. This time delay and the amount of reversal varies with the distance that the short circuit occurs from the generating station and the load being supplied from the generator. Should this inherent time delay be insufficient the protective devices on the other feeders may be prevented from operating under these conditions by including a time delay on all directional relays. This time delay would necessitate a reversal of power for a certain predetermined time before operation of the relay, and would afford sufficient time for the feeder containing the short circuit to be disconnected without also disconnecting the various other feeders due to the unusual line conditions.

With the above scheme, network protectors can be tripped from the station by opening the network feeder switch 6 at the station and applying a voltage to the station end of the feeder of reduced magnitude and slightly lagging the feeder voltage, as by closing switch 3. This voltage, being less than the network voltage, will cause a circulation of current of very low power factor from the network grid back to the station and result in a drop in voltage across the loss of voltage relay at the network protector. This drop in voltage together with the slight reversal of energy that takes place will trip the network protector. After the network protector opens it cannot reclose because the voltage on the transformer side of the open network protector, as reduced at the generating station, is less than that required to move the loss of voltage relay from the de-energized to the energized position.

Referring to Fig. 2, a modified form of protective device is disclosed in which the separate directional relay is eliminated. In this form of the invention a voltage which is proportional to the primary voltage on the transformer, that is, to the voltage on the feeder, is applied to the loss of voltage relay. This voltage is obtained by connecting an impedance in series with the loss of voltage relay, and applying a current to the impedance in phase with and proportional to the secondary of the power transformer. The values are so chosen that the voltage drop in the impedance produced by the current flowing therethrough is proportional to the voltage difference between the primary and secondary of the power transformer.

The arrangement is such that when power flows from the feeder to the network, this voltage drop is added to the secondary voltage of the transformer. Hence, the voltage on the loss of voltage relay will at all times be sufficient to maintain the closing contacts in closed position when the power flow is toward the network except upon a general disturbance of the system of such proportion as to cause the voltage to drop below the setting of the relay. When the power flow is in the opposite direction however, and at the same time there is a reduction in voltage on the primary of the power transformer, such as would be the case with a short circuit on the feeder, the voltage drop of the impedance would be subtracted from the secondary voltage, and the resultant voltage applied to the loss of voltage relay would reflect the primary voltage in the transformer, which in this case would be sufficiently low to cause the relay to operate and to close the tripping contacts.

Referring now to Fig. 2 more in detail, a network 10 is shown as energized through line 11 from the secondary 12 of a power transformer in the manner similar to that illustrated in Fig. 1. In this case, loss of voltage relay 14 is connected in series with an inductance 25 and a resistance 26, which are made proportional to the inductance and resistance of the power transformer. Said inductance and resistance are connected across the secondary 27 of a current transformer 28 the primary of which is connected in series with line 11.

It will be noted that the voltage applied to the winding of relay 14 corresponds to the voltage on line 11 plus or minus the voltage drop in inductance 25 and resistance 26. As pointed out above, the connection between the current transformer and the inductance and resistance is such that the voltage drop in impedances 25 and 26 is proportional to the voltage drop due to the internal impedance of the transformer 9 and has a sign dependent upon the direction of power flow. Hence the voltage at relay 14 constitutes the secondary voltage of transformer 9 compensated for the internal voltage drop within the transformer and is directly proportional to the primary or feeder voltage.

The operation of this scheme starting from the open position of the network switch is as follows: Whenever the network feeder is energized with potential greater than that which would obtain under short circuit conditions, the loss of voltage relay will move from the trip to the closed position, closing the network switch. The network switch remains closed until a short circuit occurs on the feeder with which it is associated, at which time the voltage across the primary of the transformer drops to a low value. The potential impressed upon the loss of voltage relay, being proportional to the primary potential, also falls to a low value allowing the relay to move to the trip position and trip out the switch. After the switch is tripped it cannot reclose provided the relay is so designed that the minimum voltage required to move the loss of voltage relay to the closing position is greater than the maximum voltage which will allow the relay to move to the trip position. The use of an equivalent primary voltage across the loss of voltage relay eliminates the necessity for great sensitivity in the loss of voltage relay because it can be adjusted for a low drop out voltage and a nearly normal closing voltage.

A further modified form of protective device is disclosed in Figs. 3 and 4, which operates in a manner similar to that disclosed in Fig. 2. Referring to Fig. 3, the various elements corresponding to Fig. 2 are given the same reference numerals. In this case loss of voltage relay 14 is connected to line 11 in series with an impedance 30, comprising a winding 31 formed on a magnetic circuit 32, having a suitable air gap 33. The magnetic circuit 32 is positioned around line 11, which in the diagram is shown as a section of a rectangular conductor. This line, which carries a substantial amount of current into the network, as for example 1200 amperes, is commonly formed from a large conductor which is suitable for this purpose. A flux will be set up in the magnetic circuit due to this current which will induce a voltage in coil 31. The winding 31 and the reluctance of the magnetic circuit 32 are so designed that the voltage induced in winding 31 due to this flux is approximately proportional to the voltage drop due to the internal impedance of the power transformer. This voltage is connected in series with the line voltage and applied to relay 14. The system operates in the manner pointed out in connection with Fig. 2, the relay 14 being supplied from the secondary 12 with a voltage proportional to the true primary or feeder voltage.

The arrangement of Figs. 2 and 3 illustrate certain ways in which the loss of voltage relay can be connected to the line. It will be obvious, however, that various other voltage compensating impedances could be employed. The arrangement of Figs. 2 and 3, however, permit the relay to be introduced on the low voltage or secondary side, and at the same time to operate as though they were connected in the primary side. Furthermore, it will be noted that the compensating impedance, in addition to reflecting the condition on the primary side of the transformer, possesses an inherent directional characteristic and eliminates the necessity for a directional relay, such as that disclosed in Fig. 1.

Referring to the system illustrated in Fig. 7 a distribution network 100 is shown as supplied through a circuit breaker 101 from a power transformer having a primary 102 and a secondary 103. The circuit breaker is adapted to be operated by closing contacts 104 and tripping contacts 105 which are controlled respectively by a loss of voltage relay 106. Said relay is operated through a suitable transformer 107, the primary of which is directly connected to the feeder 108 at the primary side 102 of the power transformer. The adjustment of relay 106 in this case would be such that tripping contacts 105 will be closed when the voltage in the feeder 108 falls below a predetermined value and that closing contacts 104 will be closed when the voltage on said feeder is restored to approximately normal.

In this system no directional feature is required inasmuch as it is desired to trip the circuit breaker whenever a fault occurs on the feeder regardless of the condition of the distribution network at that instant.

Referring now to Fig. 5 the protective system illustrated in Fig. 1 is shown as applied to a three phase transmission line 40, comprising conductors 41, which are associated with a star connected secondary 42 of a three phase power transformer 42a having a primary 42b and grounded neutral. Transformer 42a is supplied from feeder 42c which extends to a power house or other remote source of power. A three phase circuit breaker 43 is connected in conductors 41 for controlling the flow of power to a network or other utilization circuit, not shown. Circuit breaker 43 is provided with a tripping coil 44 and a closing coil 45, and carries switches 46 and 47 which cooperate with contacts 48 and 49, respectively, when the circuit breaker is in closed or open positions. Three loss of voltage relays 50, having closing contacts 51 and tripping contacts 52, are connected from the respective conductors 41 of line 40 to ground. A three phase directional relay 53, having potential coils 54 and current coils 55, the latter energized from current transformers 56, is connected to the three conductors of the three phase line, and is arranged to close switch 56' when three phase power flows from the network toward the transformer and to open said switch when the power flows from the transformer to the network. This switch corresponds to tripping contacts 17 of Fig. 1, and is connected in series with tripping coil 44, switch 46, and contacts 48, and with the three tripping contacts 52 of the loss of voltage relays so that whenever one of said contacts 52 is closed, and switches 56' and 46 are closed, the tripping coil 44 will be operated for opening the circuit breaker 43.

The closing contacts 51 of the various relays 50 are connected in series through switch 60 with closing coil 45 and contacts 49. When the circuit breaker is in open position, the switch 47 closes contacts 49 and when the voltage on the feeder has risen to a value sufficient to operate relays 50 and close the three sets of closing contacts 51, coil 45 will be energized thereby causing the circuit breaker to close. The operation of the system is otherwise similar to that described in connection with Fig. 1, although it is to be noted that the tripping coil is operated whenever the loss of voltage in one phase is sufficient to operate one of the relays 50, provided directional relay 53 is also operated to close switch 56, but that the closing coil will only operate when the voltage in all three phases has risen sufficiently to close the closing contacts of the three relays 50.

As pointed out in connection with Fig. 1, the circuit breaker could be intentionally tripped from the station by opening the feeder switch, and applying a voltage to the station end of the feeder of reduced magnitude and slightly lagging phase angle. In certain cases, however, it may be undesirable to trip the protective device in this manner. In such cases the voluntary trip may be obtained by voltage differential relay 61, comprising a pair of coils 62, which are connected from different phases of the line to ground and control the position of switch 60 with respect to closing contacts 63 and tripping contacts 64.

The switch 60 is so connected in the circuit that closing contacts 63 are in series with closing contacts 51 of relays 50, and tripping contacts 64 is in parallel with tripping contacts 52 of relays 50. A dash pot 65, or other time delay device, may be employed to retard the action of the voltage differential relay, and prevent its operation in response to normal line variations. The relay is preferably constructed with a spring 66 to normally maintain switch 60 in engagement with closing contacts 63. The relay tends to close contacts 64 when the balance between voltages impressed across coils 62 is disturbed, as will result by application of different loads 61a, 61b to the two phases to which said coils are connected. In order to effect closure of this contact, however, the energization must continue over a predetermined period of time which may be as great as three or four minutes. This time delay prevents operation of the tripping device in response to short circuits on the feeder system, and allows sufficient time for all short circuits to be cleared from the system by the operation of the proper switches before the differential voltage relay will operate. A time delay of the amount specified is not objectionable because the unbalance in voltages required to operate the relay is comparatively small and would not appreciably disturb the system.

Referring to Fig. 6 the protective system illustrated in Fig. 2 is shown as applied to a three phase star connected system with grounded neutral and is combined with another type of intentional trip. In this figure, a three phase power line 70 energized from the secondary 71 of a power transformer 71a feeds a utilization circuit through circuit breaker 72. Primary 71b of transformer 71a is supplied from a three phase feeder 71c. A plurality of compensating impedances, comprising inductances 73 and resistances 74, are connected across the secondaries of current transformers 75, which are connected in the three lines of the three phase system. A loss of voltage relay 76 is connected in series with each of said impedances in the manner described in connection with loss of voltage relay 14 of Fig. 2, and is provided with closing contacts 77 and tripping contacts 78.

Said closing contacts are connected in series with switch 79, and with closing coil 82 which is adapted to close the circuit breaker 72. The tripping contacts 78 of the three relays 76 are connected in parallel and the combination connected in series with tripping coil 83, which is adapted to trip circuit breaker 72. Coils 83 and 82 are connected through switches 80 and 81, respectively, to one side of the three phase line. Said switches are associated with the circuit breaker 72 and are operated in accordance with the position of said circuit breaker.

In the operation of the system thus far described, it will be noted that operation of any one of the three loss of voltage relays 76 will close a pair of tripping contacts 78 and energize tripping coil 83, whereby the circuit breaker will be automatically opened. In order to close the circuit breaker, however, the three relays 76 must be operated to close the three sets of closing contacts 77 thereby energizing closing coil 82. It is evident therefore, that loss of voltage, on any phase at the transformer primary, is sufficient to trip the network protector, but a normal line voltage must be applied to all three phases before the circuit breaker will again close. The operation in this respect is similar to that previously described in connection with Fig. 2.

In the above described system the loss of voltage relays are preferably set so that an extremely low voltage is required in order to bring them to the tripping position. This low voltage would require practically a short circuit at the station in order to open the protector voluntarily from that point. In order to avoid the necessity for disturbing the system to this extent, an intentional tripping device may be incorporated with the above system, which comprises a three phase directional relay 85 and a single phase directional relay 86. The three phase directional relay comprises potential coils 87 and current coils 88, which are associated with the three phases of the distribution system in the manner described in connection with the directional relay 53 of Fig. 5. Relay 85 is designed to operate switch 79 so that closing contact 90 is normally closed in response to the action of spring 91 or when three phase energy flows from the feeder into the utilization circuit or network, and tripping contact 92 is closed when three phase energy flows in the reverse direction.

Single phase directional relay 86 operates switch 93, and is so connected that contact 94 will be closed when single phase energy in the phase to which the relay is connected flows from the feeder to the network, and will be opened when single phase energy flows in the reverse direction. Time delay devices 95 and 96, such as dash pots, may be associated with switches 79 and 93, respectively, for delaying the operation thereof sufficiently to prevent their operation in response to normal fluctuations in line conditions.

A locking coil 97 is connected across one phase of the line, and is associated with switch 79 to hold closing contact 90 open after the three phase relay is once operated until the feeder is de-energized or power flows towards the network. This prevents the immediate reclosure of the circuit breaker due to the fact that the loss of voltage relay 76 may be in the closing position. It is to be understood that the torque of relay 85 when energized by power flow toward the network is sufficiently great to overcome the holding force of coil 97.

The closing contact 90 of the three phase relay 85 is connected in series with the closing contacts 77 of relays 76. Tripping contact 92 of relay 85 is connected in series with contact 94 of relay 86, and the two are connected in parallel with tripping contacts 78 of relays 76.

In the above system which is particularly applicable to a delta-star connected power transformer, the protector may be intentionally tripped by placing a single phase line to line load, as at 71d, on the feeder 71c at the generating station. This load will cause three phase power to back feed from the network to the feeder, and single phase power to flow into the network from the feeder. This condition causes directional relays 85 and 86 to operate thereby closing the two tripping contacts 90 and 94 and energizing tripping coil 83 of the circuit breaker 72. This operation is produced with practically no disturbance on the system, and at the same time the peculiar condition required to operate the two relays is not likely to obtain during the normal operation of the system.

While the intentional tripping devices have been illustrated in Figs. 5 and 6 as combined with particular automatic tripping devices, it is to be understood that these intentional tripping devices are of general application, and may be used with various types of automatic tripping devices, or may be used by themselves if desired. Furthermore, the intentional tripping device of Fig. 5 may be combined with the automatic trip of Fig. 6 or vice versa if desired. It is also contemplated that the arrangement of relays embodied in the intentional tripping devices may be useful for other purposes, and may be used for remote control of any suitable device over a power line. It is also to be understood that the protective device may be used without the intentional tripping device when desired.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a polyphase alternating current distribution system, comprising a utilization circuit and a feeder having a circuit breaker associated therewith, the method of tripping said circuit breaker from a distance, which comprises applying a load across a selected phase or phases, and thereby causing power to flow from the feeder into the utilization circuit on one or more phases and power to flow in the reverse direction on the remaining phases and utilizing this flow of power in opposite directions for tripping the circuit breaker.

2. In a polyphase alternating current distribution system, comprising a utilization circuit and a feeder having a circuit breaker associated therewith, the method of tripping said feeder from a distance, which comprises causing a reversal in power flow in one of the phases with respect to the power flow in others of said phases, and utilizing the power flow in opposite directions thus produced for tripping the circuit breaker.

3. In a polyphase distribution system comprising a utilization circuit and a supply feeder, means for disconnecting said utilization circuit from said feeder and means for remote operation of said disconnecting means comprising a differential voltage relay having one element supplied with voltage from one phase of said polyphase system and another element supplied with voltage from another phase of said polyphase system, said relays being adapted to operate in response to an unbalance between the voltages in said two phases to open said disconnecting means.

4. In a polyphase distribution system comprising a utilization circuit and a supply feeder, means for disconnecting said utilization circuit from said feeder and means for remote operation of said disconnecting means comprising a differential voltage relay having one element supplied with voltage from one phase of said polyphase system and another element supplied with voltage from another phase of said polyphase system, said relays being adapted to operate in response to an unbalance between the voltages in said two phases to open said disconnecting means, a load and means for connecting said load to one of said phases to thereby cause an unbalance between the voltages in said phases for operating said relay.

5. In a polyphase distribution system comprising a utilization circuit and a supply feeder, means for disconnecting said utilization circuit from said feeder and means for remote operation of said disconnecting means comprising a differential voltage relay having one element supplied with voltage from one phase of said polyphase system and another element supplied with voltage from another phase of said polyphase system, said relays being adapted to operate in response to an unbalance between the voltages in said two phases to open said disconnecting means and a time delay device for retarding the operation of said relay.

6. In a polyphase distribution system comprising a utilization circuit and a supply feeder, means for disconnecting said supply feeder from said utilization circuit comprising a polyphase directional relay arranged to operate when the power in the feeder is flowing in one direction, a single phase directional relay arranged to operate when power in one phase of the feeder is flowing in the opposite direction, and means for applying an unbalanced load on the polyphase feeder which causes a flow of single phase power in the direction opposite to the direction of flow of polyphase power, said unbalanced load causing said directional relays to open said disconnecting means.

7. In a polyphase distribution system comprising a utilization circuit and a supply feeder, means for disconnecting said supply feeder from said utilization circuit comprising a polyphase directional relay arranged to operate when the power in the feeder is flowing in one direction, a single phase directional relay arranged to operate when power in one phase of the feeder is flowing in the opposite direction, and means whereby operation of both of said relays causes said disconnecting means to operate.

8. In a polyphase distribution system comprising a utilization circuit and a supply feeder, means for disconnecting said supply feeder from said utilization circuit comprising a polyphase directional relay arranged to operate when the power in the feeder is flowing in one direction, a single phase directional relay arranged to operate when power in one phase of the feeder is flowing in the opposite direction, means whereby operation of both of said relays causes said disconnecting means to operate and lockout means to prevent reclosure of said disconnecting means until after said feeder has been deenergized.

9. In combination, a polyphase line, a polyphase directional relay connected thereto and a single phase directional relay connected in one phase of said line, a translating device and means whereby reversal of the direction of power flow through one of said relays only causes said relays to operate said translating device.

10. In a polyphase, alternating current distribution system, a utilization circuit, a supply feeder therefor, a circuit interrupting device connected between said feeder and said utilization circuit, a loss of voltage relay adapted to actuate said circuit interrupting device in response to a predetermined voltage drop, means for applying to said loss of voltage relay a voltage proportional to the voltage of said supply feeder whereby to cause said relay to operate when a predetermined voltage drop occurs in said feeder and means responsive to unbalanced conditions in certain phases of said supply feeder for independently operating said circuit interrupting device.

11. In a polyphase, alternating current distribution system, a utilization circuit, a supply feeder therefor, a circuit interrupting device connected between said feeder and said utilization circuit, means responsive to feeder conditions for automatically controlling said circuit interrupting device whereby to automatically disconnect said feeder from said utilization circuit in response to faults on said feeder and a voltage differential relay having elements connected to certain phases of said supply feeder and adapted to operate said circuit interrupting device when an unbalance exists between the voltages of said certain phases.

12. In a polyphase, alternating current distribution system, a utilization circuit, a supply feeder therefor, a circuit interrupting device connected between said feeder and said utilization circuit, a loss of voltage relay adapted to actuate said circuit interrupting device in response to a predetermined voltage drop, means for applying to said loss of voltage relay a voltage proportional to the voltage of said supply feeder whereby to cause said relay to operate when a predetermined voltage drop occurs in said feeder and means responsive to a reversal of flow of single phase power with respect to polyphase power flow in said supply feeder for independently operating said circuit interrupting device.

13. In a polyphase, alternating current distribution system, a utilization circuit, a supply feeder therefor, a circuit interrupting device connected between said feeder and said utilization circuit, a loss of voltage relay adapted to actuate said circuit interrupting device in response to a predetermined voltage drop, means for applying to said loss of voltage relay a voltage proportional to the voltage of said supply feeder whereby to cause said relay to operate when a predetermined voltage drop occurs in said feeder and means responsive to reverse power flow in certain phases of said supply feeder for independently operating said circuit interrupting device.

14. In a polyphase distribution system, comprising a utilization circuit and a supply feeder, a circuit breaker for disconnecting said feeder from said utilization circuit, and a relay responsive to relative direction of power flow in different phases of said feeder for tripping said circuit breaker when the power flow in one of said phases is reversed with respect to the direction of power flow in others of said phases.

15. In a polyphase distribution system, comprising a utilization circuit and a supply feeder, a circuit breaker for disconnecting said feeder from said utilization circuit, a polyphase directional relay responsive to the direction of polyphase power flow in said system, and a single phase directional relay responsive to the direction of power flow in one phase of said system, said relays being adapted to trip said circuit breaker upon reversal of polyphase power flow with respect to the power flow in said one phase.

16. In a polyphase distribution system, comprising a utilization circuit and a supply feeder, a circuit breaker for disconnecting said feeder from said utilization circuit, a polyphase directional relay responsive to the direction of polyphase power flow in said system, a single phase directional relay responsive to the direction of power flow in one phase of said system, said relays being adapted to trip said circuit breaker upon reversal of polyphase power flow with respect to the power flow in said one phase, a load, and means to supply said load to said one phase to thereby cause reversal of flow of polyphase power with respect to the direction of flow of single phase power in said one phase for operating said relays.

JOSIAH A. BROOKS.
EDGAR A. CERF, Jr.